US012655816B1

(12) United States Patent
Moreno et al.

(10) Patent No.: US 12,655,816 B1
(45) Date of Patent: Jun. 16, 2026

(54) TWO-STAGE FUEL TANK ISOLATION VALVE WITH INTEGRATED IN-LINE PRESSURE RELIEF

(71) Applicant: PHINIA JERSEY HOLDINGS LLC, Wilmington, DE (US)

(72) Inventors: Alejandro Moreno, El Paso, TX (US); Aldo Darien Venegas Carrillo, Ciudad Juarez (MX)

(73) Assignee: PHINIA Jersey Holdings LLC, Wilmington, DE (US)

( * ) Notice: Subject to any disclaimer, the term of this patent is extended or adjusted under 35 U.S.C. 154(b) by 8 days.

(21) Appl. No.: 18/985,702

(22) Filed: Dec. 18, 2024

(51) Int. Cl.
*F02M 25/08* (2006.01)

(52) U.S. Cl.
CPC .... *F02M 25/0836* (2013.01); *F02M 25/0854* (2013.01); *F02M 2025/0845* (2013.01)

(58) Field of Classification Search
CPC .................. F02M 25/0836; F02M 2025/0845
See application file for complete search history.

(56) References Cited

U.S. PATENT DOCUMENTS 9,631,583 B2 * 4/2017 Balsdon ........... B60K 15/03519
10,717,354 B2 7/2020 Bhandari et al.
10,850,609 B2 12/2020 Vulkan et al.
11,988,301 B2 5/2024 McLauchlan et al.
11,999,225 B2 6/2024 McLauchlan et al.
2002/0088441 A1 * 7/2002 Weldon .............. F02M 25/0836 123/520
2002/0185181 A1 * 12/2002 Weldon ................... F16K 3/265 137/630.19
2013/0298880 A1 11/2013 Pifer et al.
2016/0298778 A1 * 10/2016 Young .............. B60K 15/03504
2022/0042481 A1 * 2/2022 Ryu ..................... F16K 31/0696
2022/0305906 A1 * 9/2022 Ryu ................. B60K 15/03504
2023/0008621 A1 1/2023 Long et al.
2023/0085374 A1 3/2023 Lee
2023/0117796 A1 * 4/2023 Long ................ B60K 15/03504 137/199
2023/0213105 A1 7/2023 Bhandari et al.

FOREIGN PATENT DOCUMENTS

CN 107084267 B 4/2019

* cited by examiner

*Primary Examiner* — Reinaldo Sanchez-Medina
(74) *Attorney, Agent, or Firm* — WARNER NORCROSS + JUDD LLP

(57) ABSTRACT

A fuel tank isolation valve is provided. The valve includes a valve assembly disposed within a valve chamber defined by a housing, and a solenoid assembly including a moveable plunger. A first stage poppet is fixed to and extends from the moveable plunger. The valve assembly includes a head, a central body, a sleeve, and a retainer. The sleeve includes a first stage valve seat. The first stage poppet extends through the retainer and is seated on the first stage valve seat in a closed disposition. The head includes a second stage valve surface that is seated on a second stage valve seat surrounding a transfer passage formed in the housing. In a first stage open disposition, the first stage poppet is unseated from the first stage valve seat, while in a second stage open disposition, the second stage valve surface is unseated from the second stage valve seat.

17 Claims, 14 Drawing Sheets

TWO-STAGE FUEL TANK ISOLATION VALVE WITH INTEGRATED IN-LINE PRESSURE RELIEF

FIELD OF THE INVENTION

The disclosure generally relates to evaporative emissions canisters and evaporative emission control systems and, more specifically, to fuel tank isolation valves for control of evaporative emissions.

BACKGROUND OF THE INVENTION

Evaporative loss of fuel vapor generated within fuel tanks of the fuel systems of motor vehicles powered at least in part by internal combustion engines is a potential contributor to atmospheric air pollution by hydrocarbons. Canister systems that employ activated carbon to adsorb the fuel vapor emitted from the fuel systems are used to limit such evaporative emissions from the fuel tanks of gasoline-fueled automotive vehicles during refueling and diurnal temperature changes. Hybrid vehicles such as plug-in hybrid vehicles (PHEV) that are powered by both electrically driven motors operating using stored electric energy as well as gasoline-fueled internal combustion engines provide additional challenges due to intermittent operation of the internal combustion engine and the need to store pressurized fuel in the fuel tank when a hybrid vehicle is operating in the electric mode and the engine is off. Such hybrid vehicles therefore utilize a direct current valve commonly known as a fuel tank isolation valve that is located along a vapor conduit between the fuel tank and the fuel vapor canister in order to isolate the fuel tank from the canister. The fuel tank is upstream from the fuel tank isolation valve and the fuel vapor canister is downstream from the fuel tank isolation valve along the vapor flow path, and thus in a closed disposition the fuel tank isolation valve seals the fuel tank.

A fuel tank isolation valve regulates the fuel tank pressure during all of a hybrid vehicle's operating conditions. The fuel tank isolation valve is closed when it is not energized and therefore stays closed until a voltage signal is applied to the valve. When a hybrid vehicle is operating in the electric mode, the fuel tank isolation valve is de-energized so that the fuel tank is sealed closed. In this condition, the fuel tank isolation valve maintains the vapor pressure inside the fuel tank in a protected pressure range by reacting to over-pressure and under-pressure conditions in the fuel tank. The over-pressure condition may occur when the ambient temperature increases causing the vapor pressure to increase, and the under-pressure condition may occur when the ambient temperature decreases such as when the vehicle is parked, causing the vapor pressure to decrease and creating a vacuum within the fuel tank. The fuel tank isolation valve includes an internal bypass or pressure relief mechanism that opens to maintain the tank pressure within the desired range, either allowing fuel vapors to travel from the fuel tank to the canister in the over-pressure condition or fuel vapors to travel from the canister to the fuel tank in the under-pressure (over-vacuum) condition. When the hybrid vehicle is being refueled, the fuel tank isolation valve is opened by a direct voltage signal sent to the valve. Opening of the fuel tank isolation valve allows fuel vapors to travel from the fuel tank into the fuel vapor canister to prevent the fuel vapors from backing out of the fuel tank and being released into the atmosphere and to prevent back-pressure from letting the fuel tank become completely filled. The fuel tank isolation valve thereby avoids the release of fuel vapors to the external environment when the fuel tank is pressurized, and helps to control fuel vapor emission when the vehicle is driven in the electric mode and/or when the fuel vapor canister is saturated.

A continued need exists, however, for a fuel tank isolation valve that provides any one of the advantages of having lower production cost, reduced size, lower weight, improved performance, and lower power consumption.

BRIEF SUMMARY

An improved fuel tank isolation valve is provided. The fuel tank isolation valve includes a housing having an outer wall defining a valve chamber therein. A transfer passage is formed in a portion of the outer wall. A tank port is connected to the housing. A canister port is also connected to the housing. The tank port is in selective fluid communication with the canister port via the valve chamber and transfer passage. A solenoid assembly is connected to the housing. The solenoid assembly includes: a stationary core; a moveable plunger having a first end and a second end longitudinally opposed to the first end, the first end being adjacent the stationary core; a coil that encircles the stationary core and the moveable plunger, the coil actuating the moveable plunger; and a primary spring disposed between the stationary core and the moveable plunge. A first stage poppet is fixed to and extends from the second end of the moveable plunger. A valve assembly is disposed within the valve chamber. The valve assembly includes a head, a central body, and a sleeve. The central body is sandwiched between the head and the sleeve. The sleeve includes a first stage valve seat. The first stage poppet is seated on the first stage valve seat in a closed disposition. The valve assembly further includes a retainer mated with the sleeve. The retainer includes an internal spring seat. A first stage spring is seated on the internal spring seat. The first stage poppet extends through the retainer, and the first stage spring is disposed between the first stage poppet and the internal spring seat of the retainer.

In specific embodiments, the valve assembly further includes a pressure relief poppet, the central body includes a relief valve seat, and the pressure relief poppet is seated on the relief valve seat in a closed disposition.

In particular embodiments, the central body includes a relief spring seat opposite the relief valve seat, and a relief valve spring is seated on the relief spring seat and disposed between the relief spring seat and an end of the pressure relief poppet.

In certain embodiments, a retainer ring is disposed on the end of the relief valve poppet, and the relief valve spring is engaged with the retainer ring.

In specific embodiments, a second stage valve seat surrounds the transfer passage.

In particular embodiments, a sealing ring is disposed on an annular rim of the head of the valve assembly. The sealing ring defines a second stage valve surface, and the sealing ring is seated on the second stage valve seat in a closed disposition.

In certain embodiments, the valve assembly is operable between the closed disposition, a first stage open disposition, and a second stage open disposition. In the first stage open disposition, activation of the coil draws the moveable plunger toward the stationary core and unseats the first stage poppet from the first stage valve seat while the second stage valve surface remains seated on the second stage valve seat. In the second stage open disposition, maintained activation of the coil draws the moveable plunger closer to the stationary core and unseats the second stage valve surface from the second stage valve seat while the first stage valve surface is seated on the first stage valve seat.

In specific embodiments, the sleeve includes at least one tank pressure passage formed through a sidewall of the sleeve.

In particular embodiments, the sleeve includes a first stage valve opening surrounded by the first stage valve seat. The first stage valve opening is in fluid communication with the valve chamber via the at least one tank pressure passage of the sleeve.

In certain embodiments, the central body includes a plurality of first stage flow passages, the head includes a corresponding plurality of first stage flow passages, and the first stage valve opening is in fluid communication with the transfer passage via the first stage flow passages in the central body and the head.

In specific embodiments, the central body and the head together define a pressure relief valve chamber, the central body further includes a plurality of first stage flow passages outside of the pressure relief valve chamber, and the head further includes a plurality of first stage flow passages outside of the pressure relief valve chamber. The first stage flow passages of the central body are continuous with and in fluid communication with the first stage flow passages of the head.

In particular embodiments, the pressure relief valve chamber is in fluid communication with the first stage flow passages of the central body and the first stage flow passages of the head via a relief valve opening.

In particular embodiments, the central body includes at least one tank relief passage extending from a sidewall of the central body to the pressure relief valve chamber.

In certain embodiments, in a first stage open disposition of the valve, the valve includes a fuel vapor flow path from the tank port into the valve chamber, from the valve chamber through the at least one tank pressure passage into the sleeve, through the first stage valve opening in the sleeve to the central body, through the first stage flow passages in the central body to the head, through the first stage flow passages in the head to the transfer passage, and through the transfer passage into the canister port.

In certain embodiments, in a second stage open disposition of the valve, the valve includes a fuel vapor flow path from the tank port into the valve chamber, past the second stage valve surface of the valve member, and through the transfer passage into the canister port.

A method of operating a fuel tank isolation valve is also provided. The method includes the step of providing a fuel tank isolation valve according to any of the embodiments described above. The method further includes applying a control voltage to the coil of the solenoid assembly, wherein the valve assembly moves from a closed disposition to a first stage open disposition such that the moveable plunger is drawn toward the stationary core and unseats the first stage poppet from the first stage valve seat while the second stage valve surface remains seated. The method further includes maintaining the application of the control voltage to the coil of the solenoid assembly, wherein the valve assembly moves from the first stage open disposition to a second stage open disposition such that the moveable plunger is drawn closer to the stationary core and unseats the second stage valve surface from the second stage valve seat while the first stage poppet becomes seated on the first stage valve seat.

An evaporative emission control system for a vehicle is also provided. The system includes a fuel tank, an evaporative emissions canister; and a fuel tank isolation valve according to any of the embodiments described above. The fuel tank isolation valve is connected between the fuel tank and the evaporative emissions canister.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

A fuel tank isolation valve for a fuel system is provided. Referring to FIGS. 1-20, wherein like numerals indicate corresponding parts throughout the several views, the fuel tank isolation valve is illustrated and generally designated as 20. The fuel tank isolation valve 20 is a two port, three position valve that provides for one or more of a reduction in force required to open the valve, a reduction in coil and solenoid size, a reduction in the number of valve components, and a reduction in cost.

Figure 1:
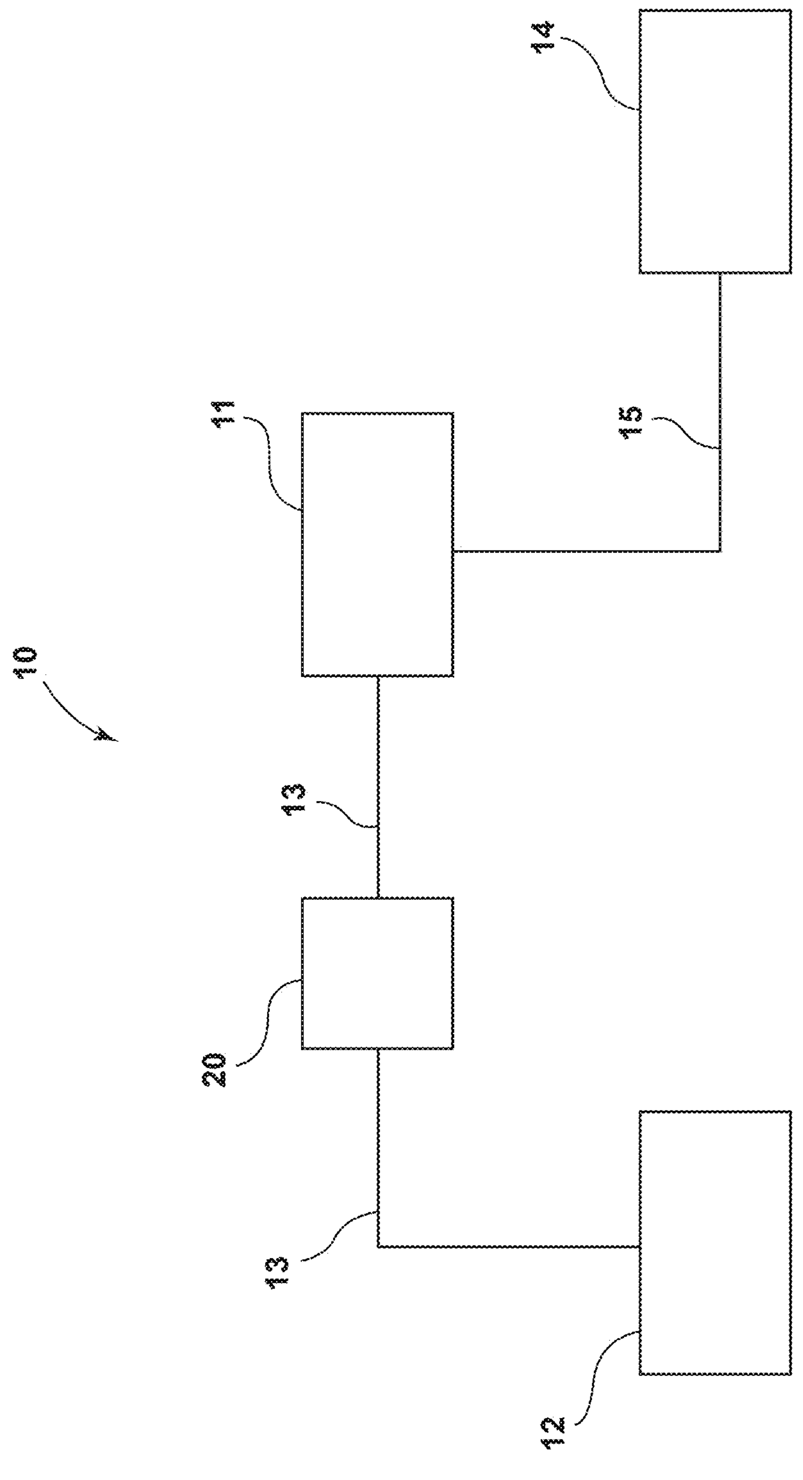
FIG. 1 is a schematic view of an evaporative emissions control system including a fuel tank isolation valve in accordance with embodiments of the disclosure.
Figure 2:
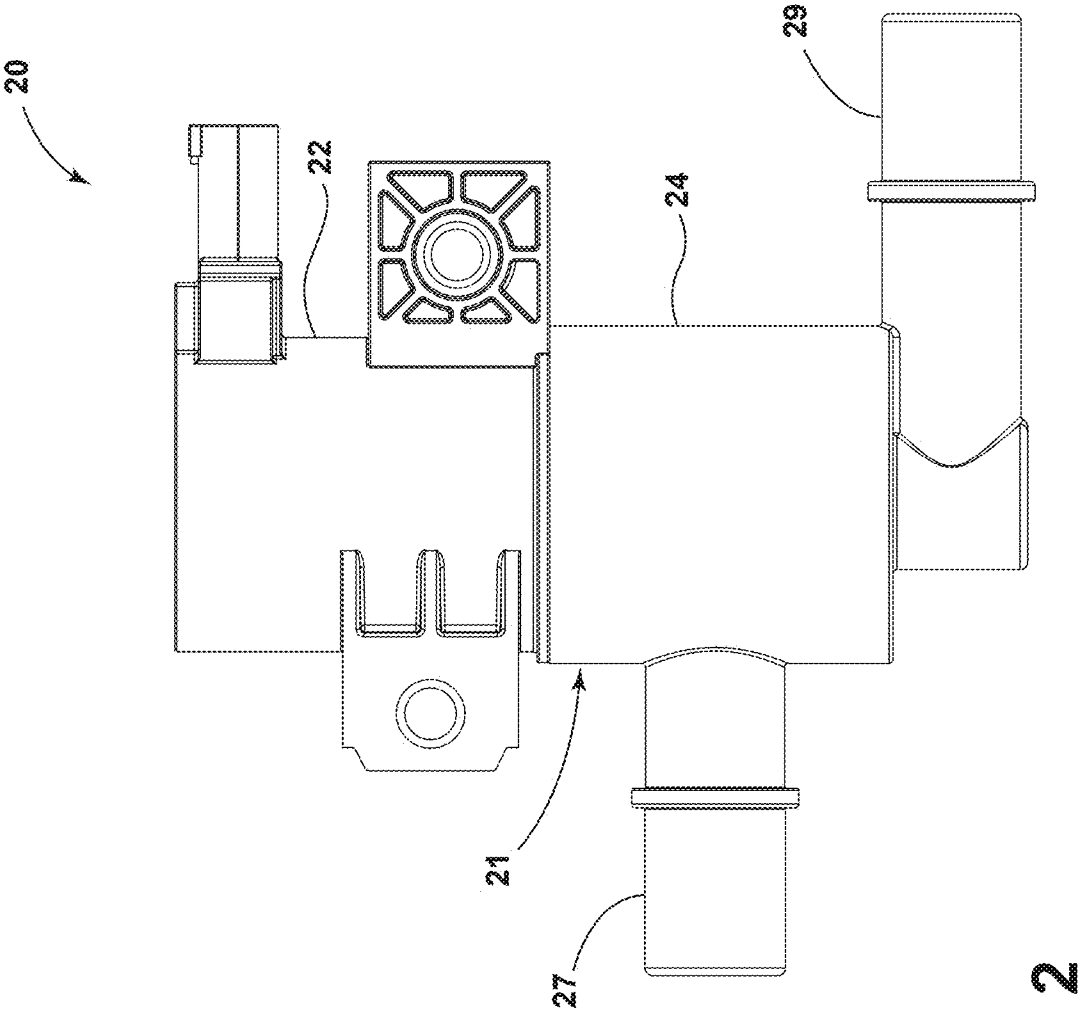
FIG. 2 is a side view of the fuel tank isolation valve.
Figure 3:
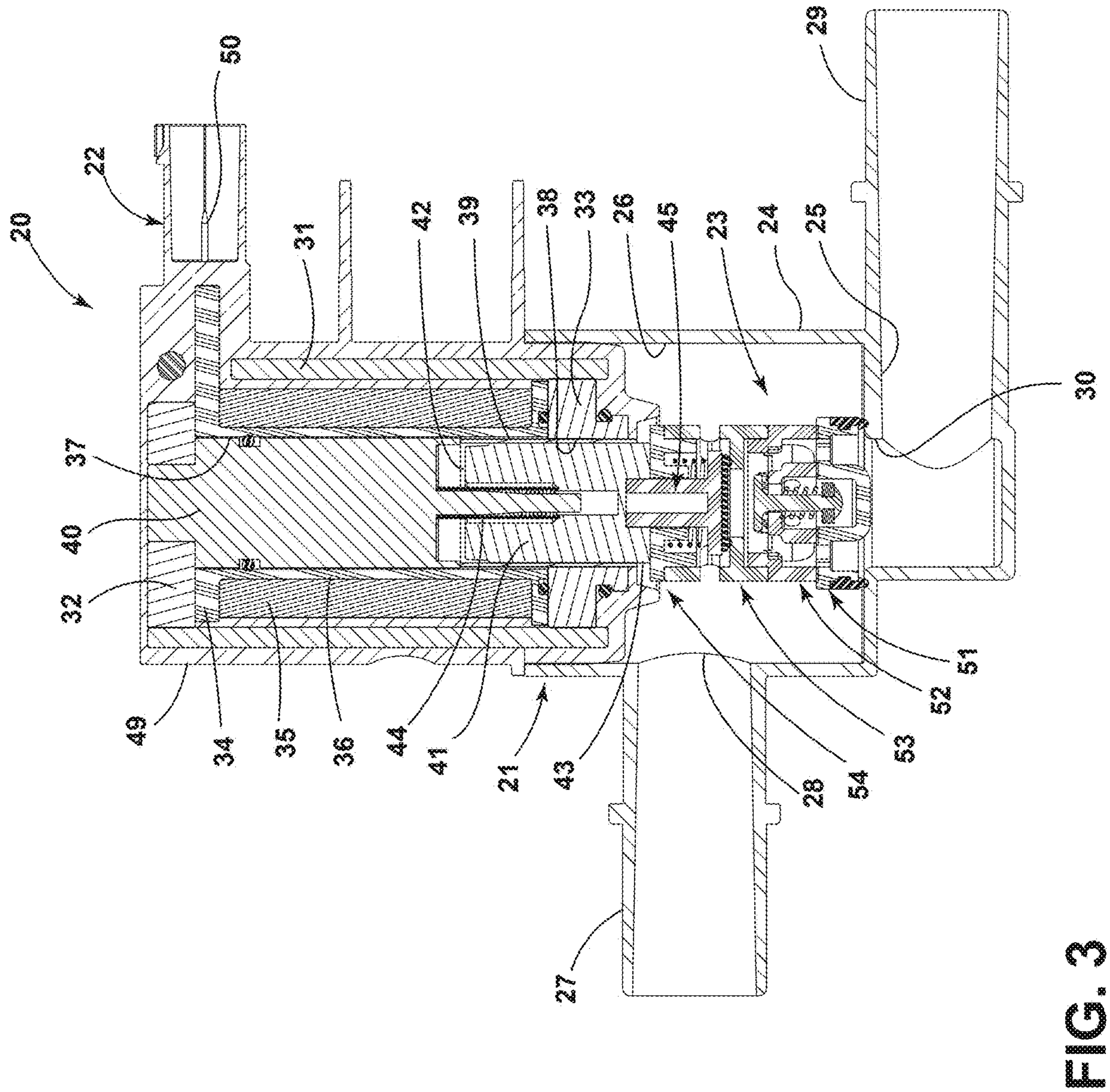
FIG. 3 is a sectional view of the fuel tank isolation valve of FIG. 2.
Figure 4:
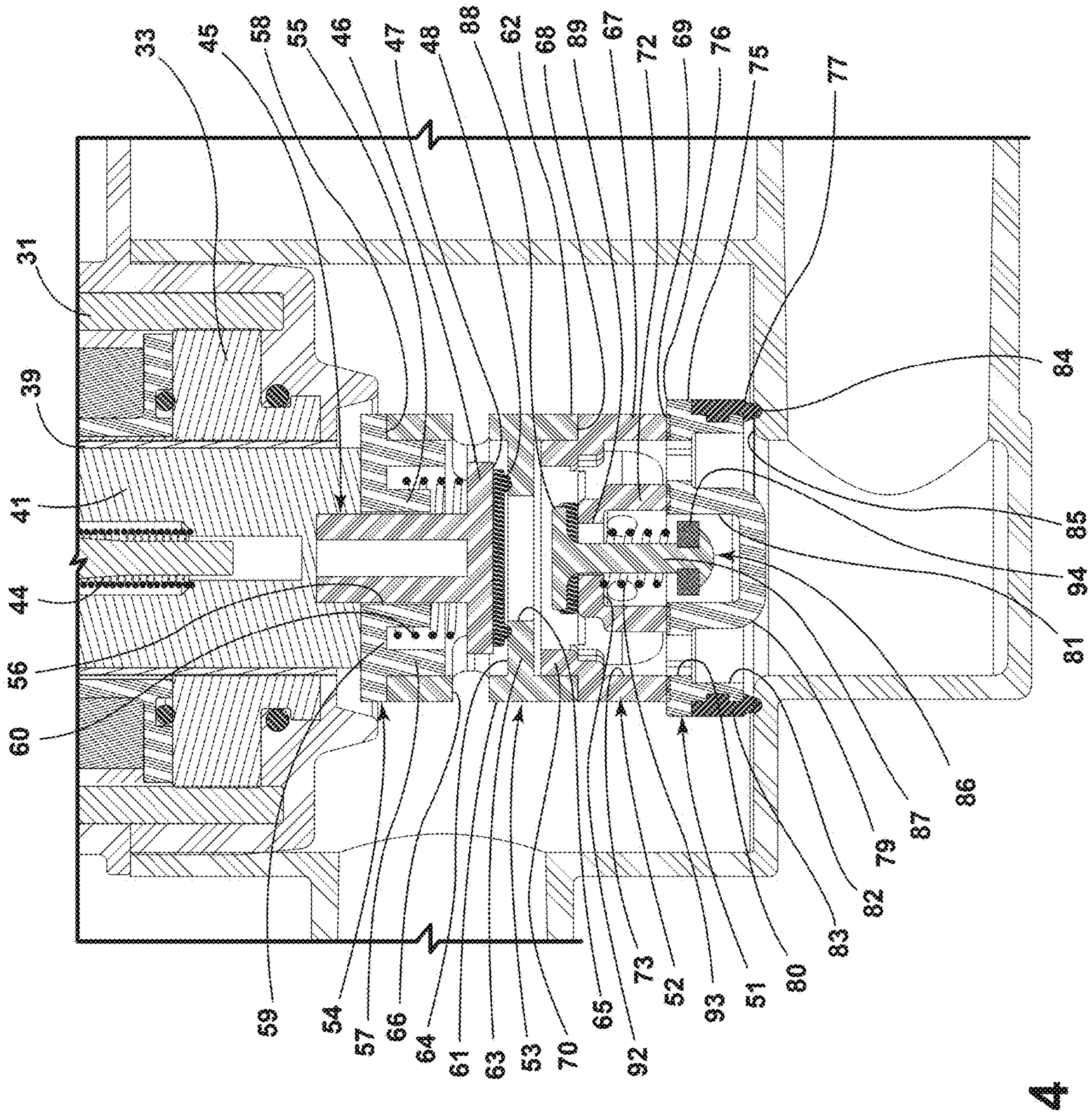
FIG. 4 is an enlarged portion of the sectional view of the fuel tank isolation valve in FIG. 3.
Figure 5:
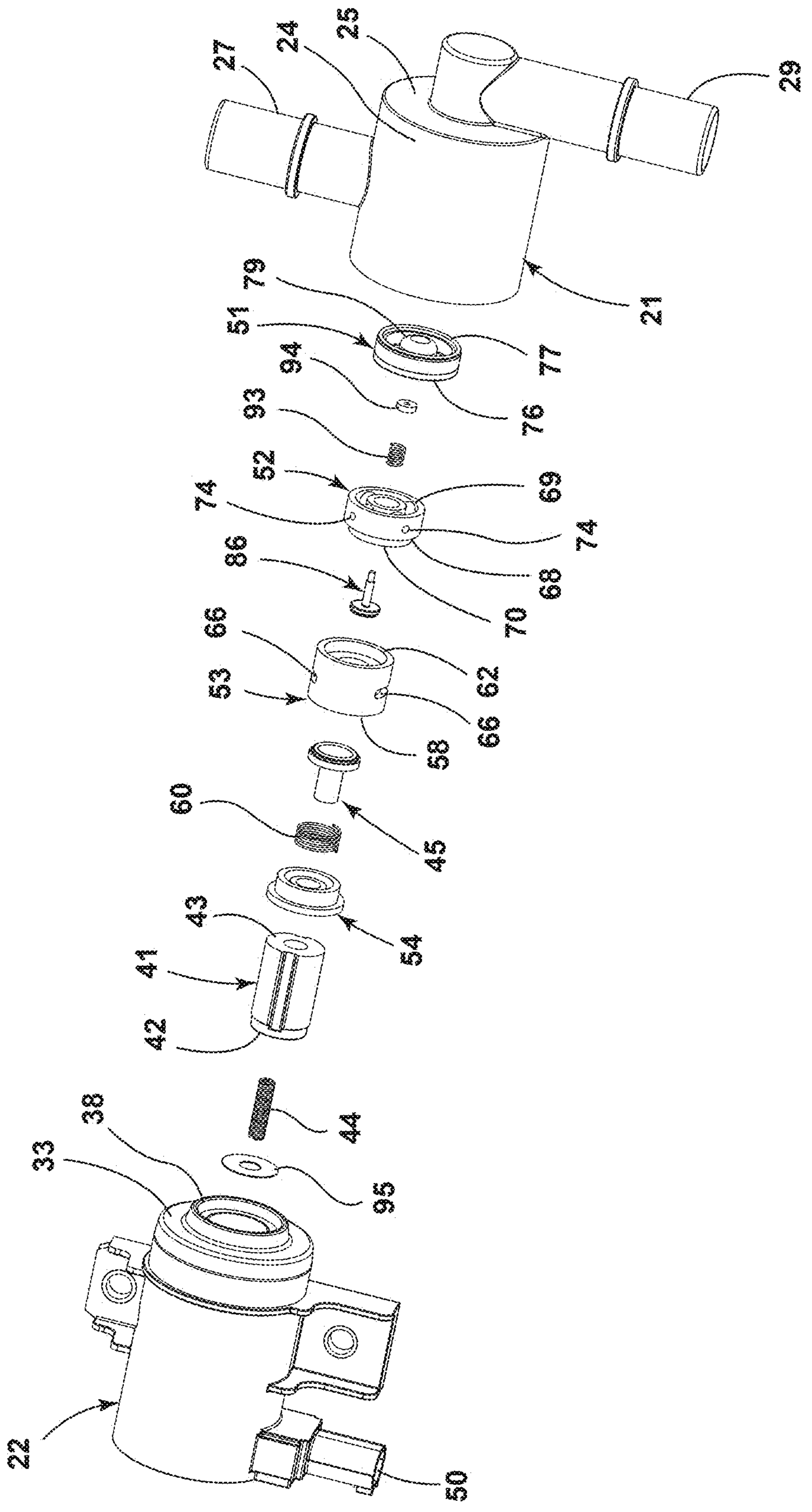
FIG. 5 is an exploded view of the fuel tank isolation valve of FIG. 2.
Figure 6:
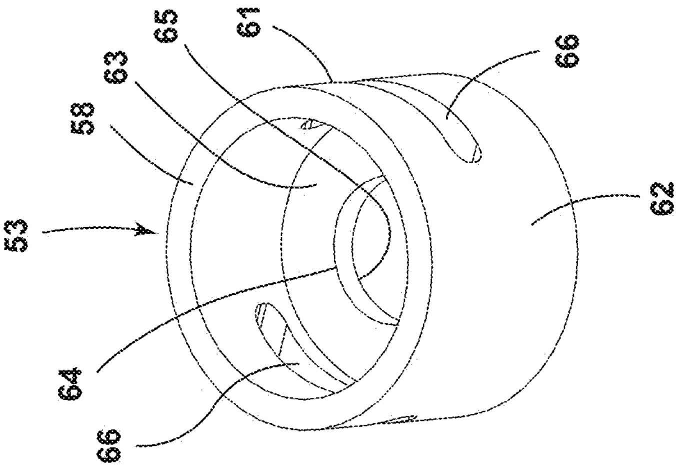
FIG. 6 is a perspective view of a sleeve of a valve assembly of the fuel tank isolation valve.
Figure 7:
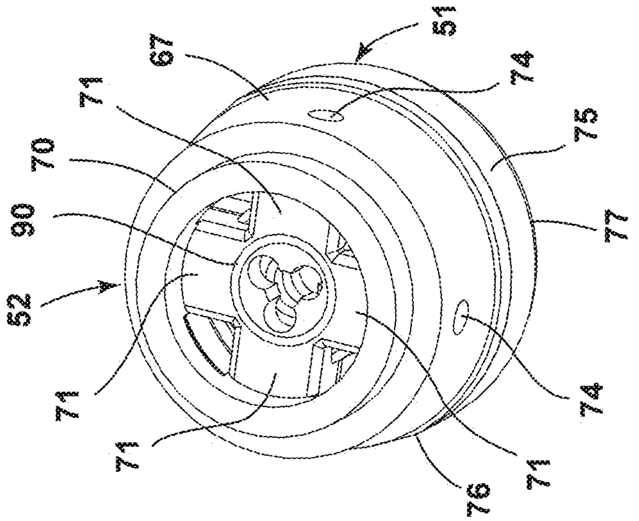
FIG. 7 is a perspective view of a central body and head of the valve assembly of the fuel tank isolation valve.
Figure 8:
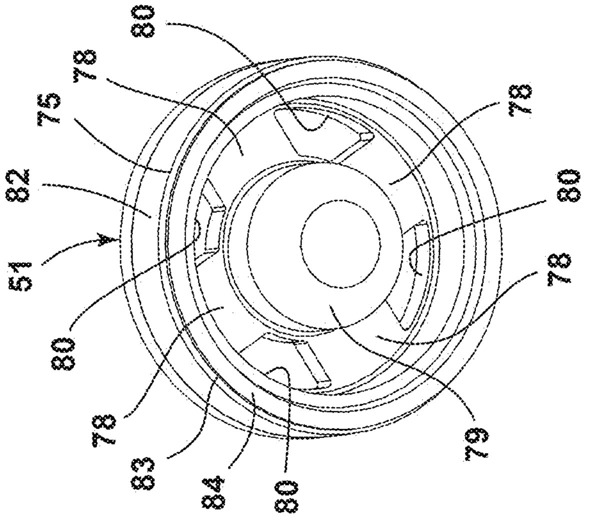
FIG. 8 is a perspective view of the head of the valve assembly of the fuel tank isolation valve.
Figure 10:
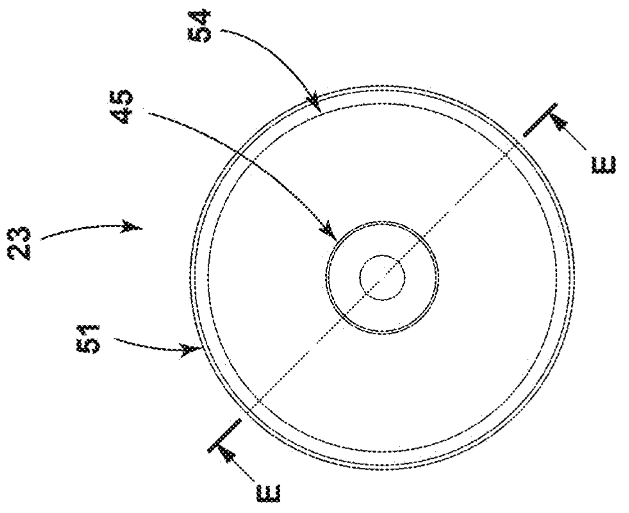
FIG. 10 is a plan view of the valve assembly of the fuel tank isolation valve.
Figure 9:
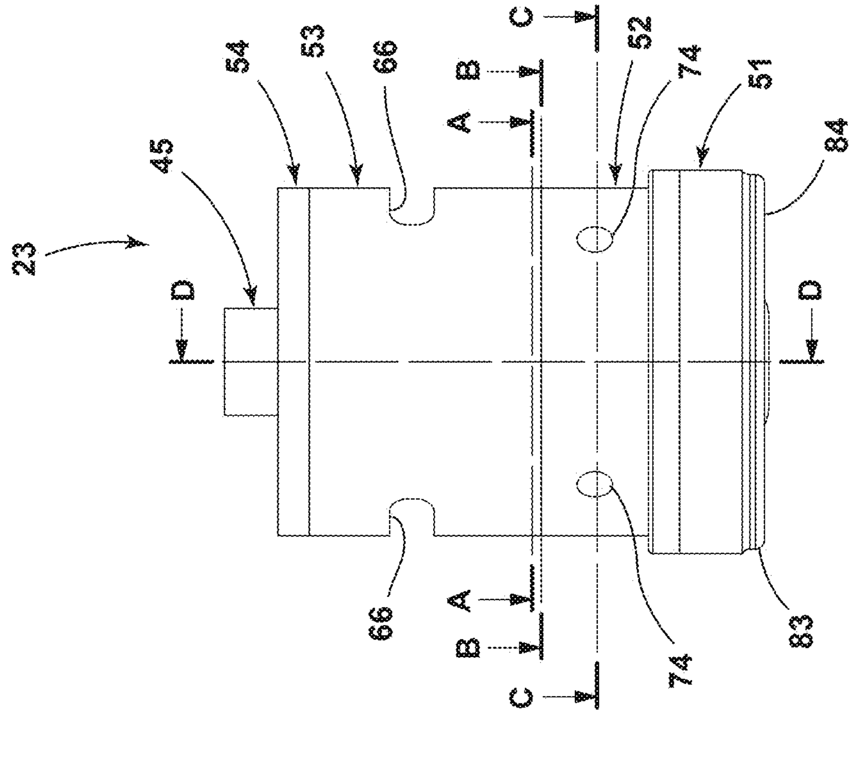
FIG. 9 is a side view of the valve assembly of the fuel tank isolation valve.
Figure 11:
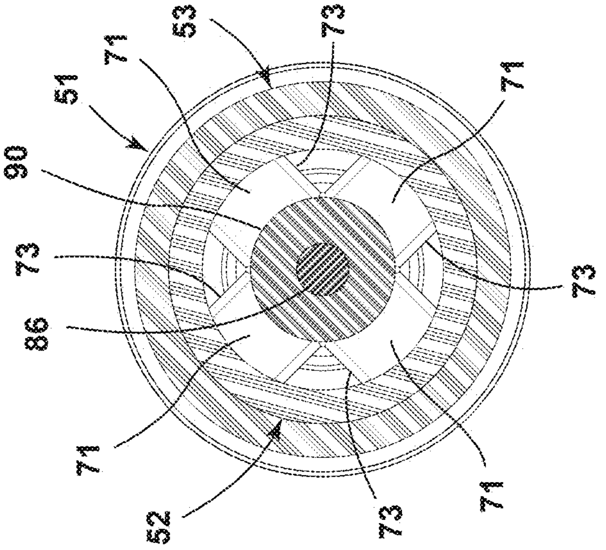
FIG. 11 is a sectional view of the valve assembly taken along the line A-A in FIG. 9.
Figure 12:
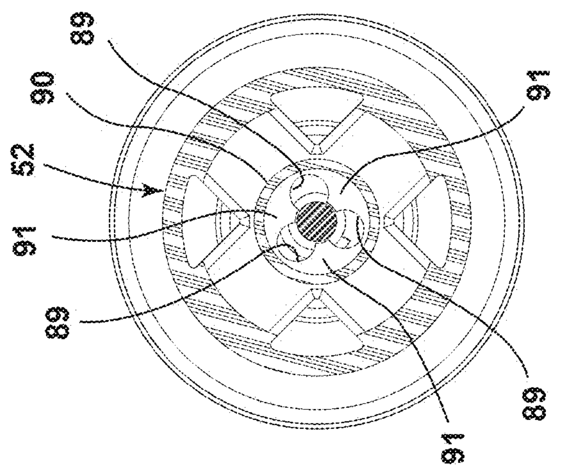
FIG. 12 is a sectional view of the valve assembly taken along the line B-B in FIG. 9.
Figure 13:
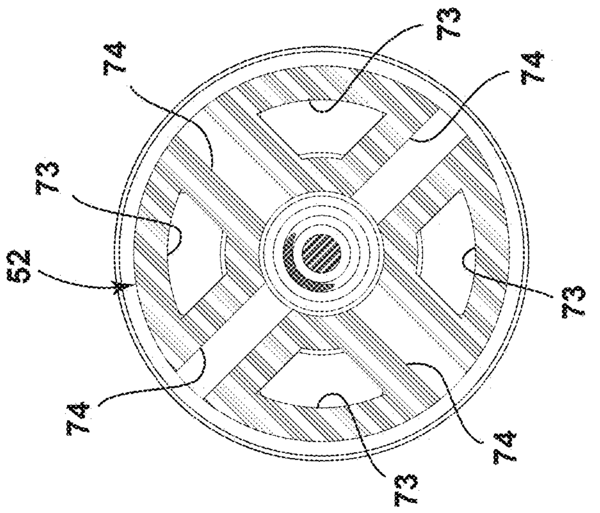
FIG. 13 is a sectional view of the valve assembly taken along the line C-C in FIG. 9.
Figure 15:
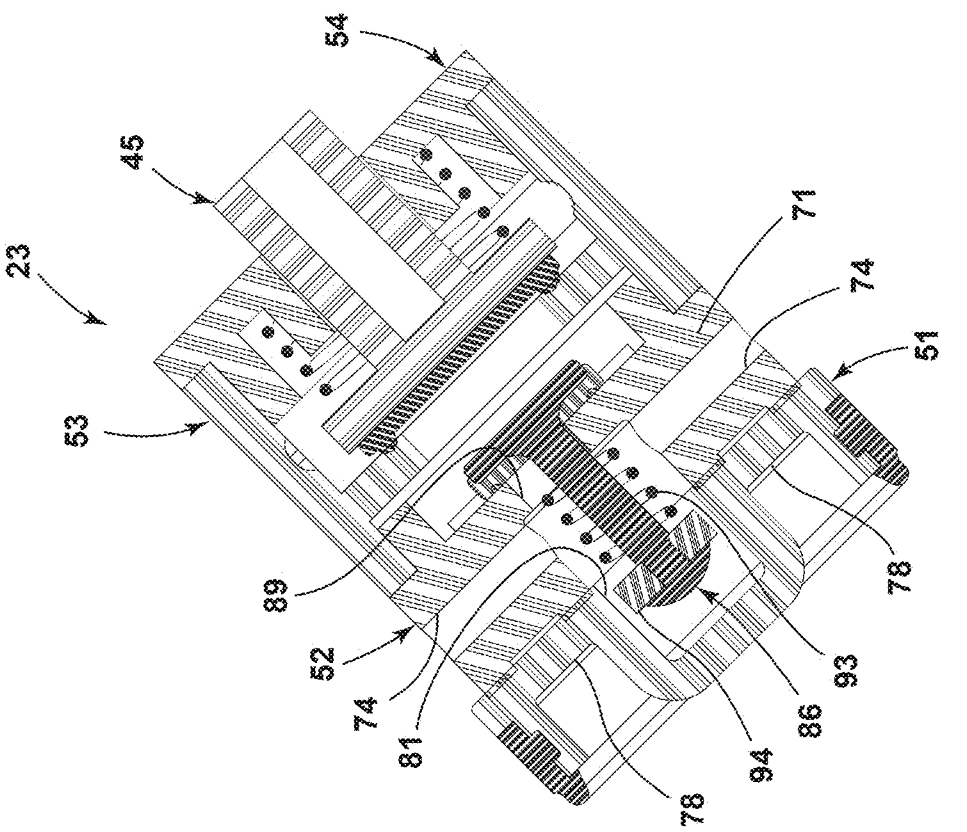
FIG. 15 is a sectional view of the valve assembly taken along the line E-E in FIG. 10.
Figure 14:
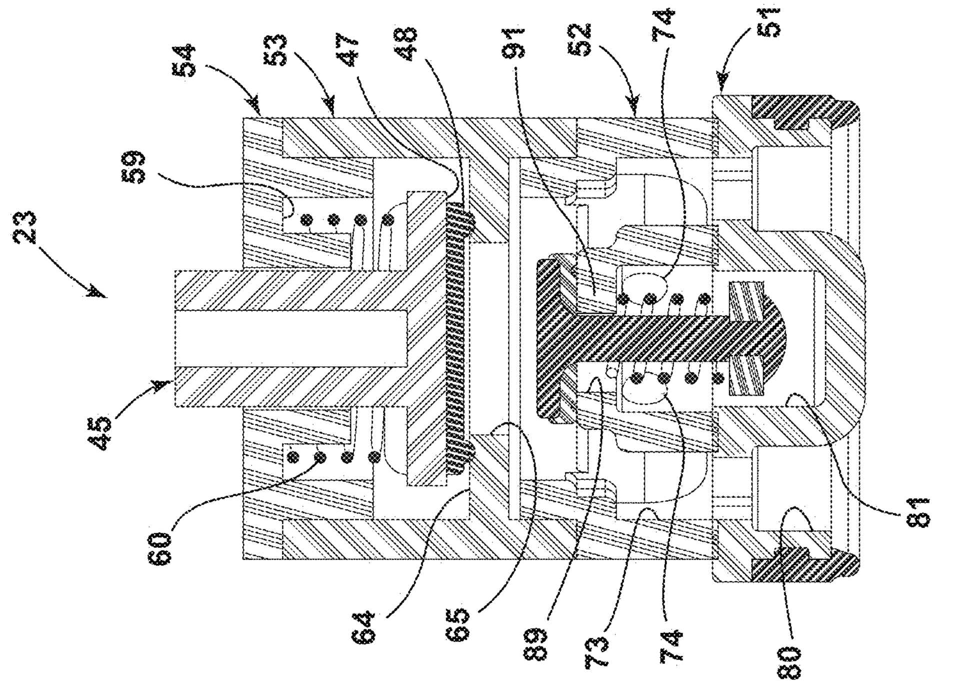
FIG. 14 is a sectional view of the valve assembly taken along the line D-D in FIG. 9.

With reference first to FIG. 1, an evaporative emission control system 10 for a vehicle fuel system generally includes an evaporative emissions canister 11 connected to and in fluid communication with a fuel tank 12 by a fuel vapor line 13 in the form of a tube, pipe, or other similar conduit. The evaporative emissions canister 11, also known as a fuel vapor canister, contains an absorbent such as an activated carbon material or similar that adsorbs fuel vapors generated and/or contained in the fuel tank 12. The evaporative emissions canister 11 is not particularly limited and may be any suitable evaporative emissions canister as known in the art. The fuel tank 12 is also not particularly limited and may be any storage container suitable for storing a supply of fuel as known in the art. The evaporative emissions canister 11 is connected downstream to and in fluid communication with an air intake system of an internal combustion engine 14 of the vehicle by a purge line 15 in the form of a tube, pipe, or other similar conduit. The purge line 15 allows for purging of fuel vapors collected in the evaporative emissions canister 11 from the fuel tank 12 for consumption during the combustion process in the engine 14. The internal combustion engine is not particularly limited and may be any internal combustion engine as known in the art. In certain vehicles, such as hybrid electric vehicles that include both an electric motor driven by battery-stored power and an internal combustion engine operated by burning fuel such as gasoline, a fuel tank isolation valve such as the fuel tank isolation valve 20 is connected to the fuel vapor line 13 between the fuel tank 12 and the evaporative emissions canister 11. The fuel tank isolation valve 20 is in fluid (fuel vapor) communication with both the fuel tank 12 and the evaporative emissions canister 11 via the fuel vapor line 13, with the fuel tank isolation valve 20 being downstream from the fuel tank 12 along a fuel vapor pathway formed by the vapor line 13 and upstream from the evaporative emissions canister 11 along the fuel vapor pathway.

With reference next to FIGS. 2-8, in some exemplary embodiments the fuel tank isolation valve 20 includes a housing 21, a solenoid assembly 22, and a valve assembly 23. The housing 21 has outer walls 24, 25 that define an internal valve chamber 26 within the housing 21. A tank port 27 is connected to the housing 21 and is in fluid communication with the valve chamber 26 through an opening 28 in the wall 24. A canister port 29 is also connected to the housing 21 and is in fluid communication with the valve chamber 26 through a transfer passage opening 30 formed in the wall 25 of the housing 21. The canister port 29 is thereby in fluid communication with the tank port 27 via the valve chamber 26.

The solenoid assembly 22 is connected to the housing 21 opposite the outer wall 25 and closes an open end of the housing 21 such that the solenoid assembly 22 is adjacent to and extends into a side of the valve chamber 26. The solenoid assembly 22 includes a generally cylindrical frame 31. A first plate 32 is disposed at one end of the frame 31 and a second plate 33 is disposed at an opposite end of the frame 31. A spool 34 is disposed within the frame 31 and is sandwiched between the first plate 32 and the second plate 33. A conductive coil 35 is wound around the spool 34 and is electrically connected to an electric terminal 50 that extends from the subassembly of the spool 34 and coil 35. The spool 34 includes a tubular portion 36 that defines a central cylindrical opening 37 within the solenoid assembly 22 that is colinear with a central cylindrical opening 38 formed in the second plate 33. The walls of the central cylindrical openings 37, 38 may be lined with a bushing 39. A stationary core 40 is connected to or integrally formed with the first plate 32. The stationary core 40 extends into the central cylindrical opening 37 inside of the bushing 39. A moveable plunger 41 is disposed in the central cylindrical openings 37, 38 of the spool 34 and second plate 33. The spool 34 and coil 35 thereby encircle both the stationary core 40 and the moveable plunger 41. The moveable plunger 41 is slidable within the bushing 39. The moveable plunger 41 has a first end 42 and a second end 43 that is longitudinally opposed to the first end 42. A primary spring 44 in the form of a coil compression spring is disposed between and in urged engagement with the stationary core 40 and the first end 42 of the moveable plunger 41. An impact dampener in the form of a magnetic break ring 95 controls the magnetic air gap between the moveable plunger 41 and the stationary core 40. The magnetic break ring 95 prevents against metal-to-metal contact noise between the moveable plunger 41 and the stationary core 40 and also prevents against magnetic lock so the moveable plunger 41 does not stay attached to the stationary core 40 with the residual voltage from the controller used to energize and de-energized the solenoid assembly 22 via the electric terminal 50. The second end 43 of the moveable plunger 41 extends outwardly from the second plate 33 through the central cylindrical opening 38 in the second plate 33. A first stage poppet 45 is fixed to and extends from the second end 43 of the moveable plunger 41. The first stage poppet 45 has a head 46 having an outer face surface 47. A seal 48 is disposed on the outer face surface 47. An overmold 49 may cover and generally encase the components of the solenoid assembly 22.

The valve assembly 23 is disposed in the valve chamber 26 of the housing 21 and is adjacent the second end 43 of the moveable plunger 41. The valve assembly 23 includes a head 51, a central body 52, a sleeve 53, and a retainer 54. The central body 52 is sandwiched between the head 51 and the sleeve 53. The retainer 54 has a disk-like, tubular shape with an inner flange 55 defining a tubular opening 56 through which the stem of the first stage poppet 45 extends. The retainer 54 also has an outer flange 57 that is inserted into a first end 58 of the sleeve 53 to mate the retainer 54 with the sleeve 53. An inner surface of the retainer 54 between the inner flange 55 and the outer flange 57 defines an internal spring seat 59. A first stage spring 60 in the form of a coil compression spring is disposed between and engaged with the internal spring seat 59 and the head 46 of the first stage poppet 45.

The sleeve 53 of the valve assembly 23 is generally tubular and has an outer cylindrical sidewall 61 extending from the first end 58 of the sleeve to a second end 62 of the sleeve. An inner annular ring 63 is disposed within the outer sidewall 61 and extends inwardly from the outer sidewall. A surface of the inner annular ring 63 defines a first stage valve seat 64, and an inner edge of the inner annular ring 63 defines a first stage valve opening 65 that is surrounded by the first stage valve seat 64. The first stage poppet 45, and particularly the seal 48 on the outer face surface 47 of the head 46 of the first stage poppet 45, engages and is seated on the first stage valve seat 64 in a closed disposition of the first stage poppet 45. One or more tank pressure passages 66 are formed in the sidewall 61 of the sleeve 53. Each tank pressure passage 66 is an elongated, arcuate opening that extends in a radial direction around a portion of the circumference of the sidewall 61, for example but not limited to extending circumferentially between 30 and 90 degrees. As shown in the drawings, the sleeve 53 may include two of the tank pressure passages 66, and the two tank pressure passages may be generally opposite each other in the radial direction along the circumference of the sidewall 61. The tank pressure passages 66 in the sleeve 53 provide fluid communication between the valve chamber 26 and the first stage valve opening 65 within the sleeve 53.

The central body 52 is generally tubular and has an outer cylindrical sidewall 67 extending from a first end 68 of the central body to a second end 69 of the central body. The sidewall 67 has a stepped portion 70 at the first end 68 which is inserted into and mated with the second end 62 of the sleeve 53. In a mated, assembled configuration between the sleeve 53 and the central body 52, the sidewall 61 of the sleeve 53 is generally continuous with the sidewall 67 of the central body 52. A set of arms 71 extend inwardly towards a center of the central body 52 and are connected to an inner tubular wall 72 that is spaced from the outer sidewall 67. As shown in the drawings and with additional reference now to FIGS. 9, 11, and 13-15, the central body 52 may include four arms 71, but alternatively may include more or fewer arms. The open spaces between the inner wall 72, the outer sidewall 67, and the arms 71 define first stage flow passages 73 in the central body 52. A tank relief passage 74 is formed within each arm 71 and extends from the outer sidewall 67 to the inner wall 72 through the arm 71.

The head 51 is also generally tubular and has an outer cylindrical sidewall 75 extending from a first end 76 of the head to a second end 77 of the head. In an assembled configuration, the first end 76 of the head 51 contacts the second end 69 of the central body 52. A set of arms 78 extend inwardly towards a center of the head 51 and are connected to an inner tubular, cup-shaped wall 79 that is spaced from the outer sidewall 75. As shown in the drawings, the head 51 may include four arms 78, but alternatively may include more or fewer arms. Preferably, the number of arms 78 in the head 51 is equal to the number of arms 71 in the central body 52. The open spaces between the cup-shaped inner wall 79, the outer sidewall 75, and the arms 78 define first stage flow passages 80 in the head 51. The first stage flow passages 80 in the head 51 are continuous with and colinear with the first stage flow passages 73 in the central body 52 such that the first stage flow passages 80 in the head 51 are in fluid communication with the first stage flow passages 73 in the central body 52. The cup-shaped inner wall 79 of the head 51 is also continuous with the inner wall 72 of the central body 52 such that the cup-shaped inner wall 79 of the head 51 and the inner wall 72 of the central body 52 together define an inner pressure relief valve chamber 81 discussed in more detail below. The head 51 terminates in an annular rim 82 at the second end 77. A sealing ring 83 preferably made of compliant material such as rubber or similar elastic or elastic-like material is disposed around the annular rim 82 and defines a second stage valve surface 84. A surface of the wall 25 of the housing 21 that surrounds the transfer passage 30 defines a second stage valve seat 85, and in a closed disposition the second stage valve surface 84 of the head 51 is seated on the second stage valve seat 85.

The valve assembly 23 further includes a pressure relief poppet 86 having a stem 87 and a head 88. The pressure relief poppet 86 is internally disposed within the valve assembly 23 and is axially aligned with a longitudinal axis of the valve assembly 23 as well as the first stage poppet 45 and moveable plunger 41. With additional reference to FIGS. 9 and 12, the central body 52 of the valve assembly 23 includes a first internal surface adjacent the inner tubular wall 72. The first internal surface surrounds a relief valve opening 89 and defines a relief valve seat 90. In a closed disposition of the pressure relief poppet 86, the head 88 of the pressure relief poppet 86 is seated on the relief valve seat 90. Petal-like projections 91 extend into the relief valve opening 89 and contact the stem 87 of the pressure relief poppet 86 to maintain the proper axial alignment of the pressure relief poppet. The central body 52 further includes a second internal surface that is opposite the first internal surface and within the pressure relief valve chamber 81. The second internal surface defines a relief spring seat 92, and a relief valve spring 93 in the form of a coil compression spring is seated on the relief spring seat 92. A retainer ring 94 is disposed on an end of the stem 87 of the pressure relief poppet 86 distal from the head 88. The retainer ring 94 keeps the relief valve spring 93 on the stem 87 of the pressure relief poppet 86 and maintains that relief valve spring 93 in urged engagement between the relief spring seat 92 and the retainer ring 94, and in the closed disposition of the pressure relief poppet 86, the relief valve spring 93 urges the head 88 into engagement with the relief valve seat 90.

Figure 16:
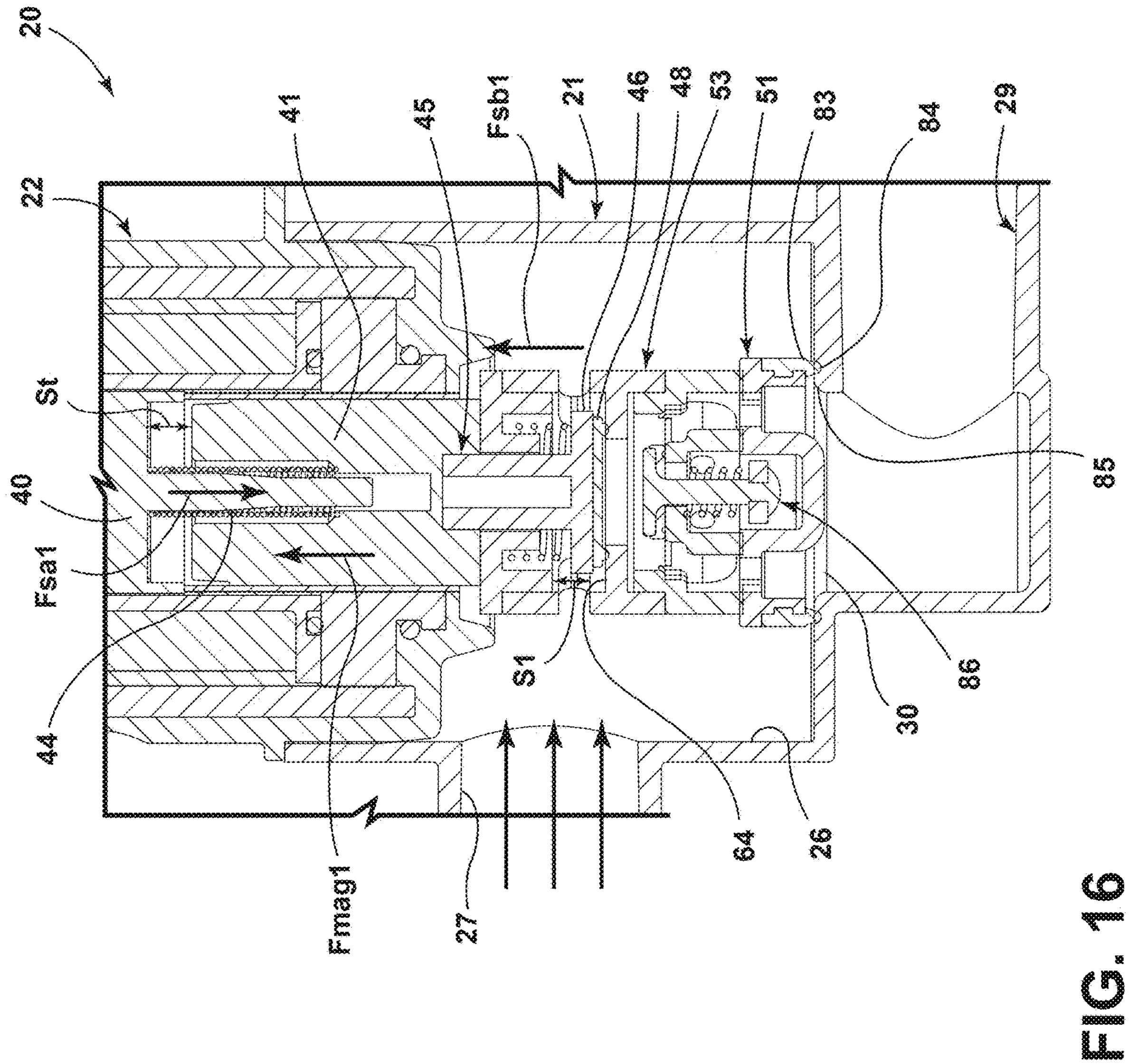
FIG. 16 is a sectional view of a portion of the fuel tank isolation valve of FIG. 2 illustrating a closed disposition of the valve.

Turning next to FIG. 16, when no control voltage is applied to the solenoid 22, the fuel tank isolation valve 20 is in a de-energized/deactivated state and a closed disposition. The head 46 of the first stage poppet 45, including the seal 48, is seated on the first stage valve seat 64 of the sleeve 53. The second stage valve surface 84 of the head 51, including sealing ring 83, is seated on the second stage valve seat 85 of the housing 21. In this closed disposition, the fuel tank isolation valve 20 seals the fuel tank by preventing fuel vapors (shown by arrows) that enter the valve chamber 26 through the tank port 27 from passing through the valve assembly 23 and transfer passage 30. Thus, the flow rate through the fuel tank isolation valve 20 is zero. Further, in the disposition shown in FIG. 16, the vapor pressure in the fuel tank is within an acceptable range, and thus the pressure relief poppet 86 remains closed since the pressure of the fuel vapor entering the valve chamber 26 is not great enough to unseat the pressure relief poppet 86, of which opening is described in detail below. The distance between the stationary core 40 and the moveable plunger 41 separated by the primary spring 44 is a distance St, which is the total allowable travel of the moveable plunger 41 relative to the stationary core 40.

Figure 17:
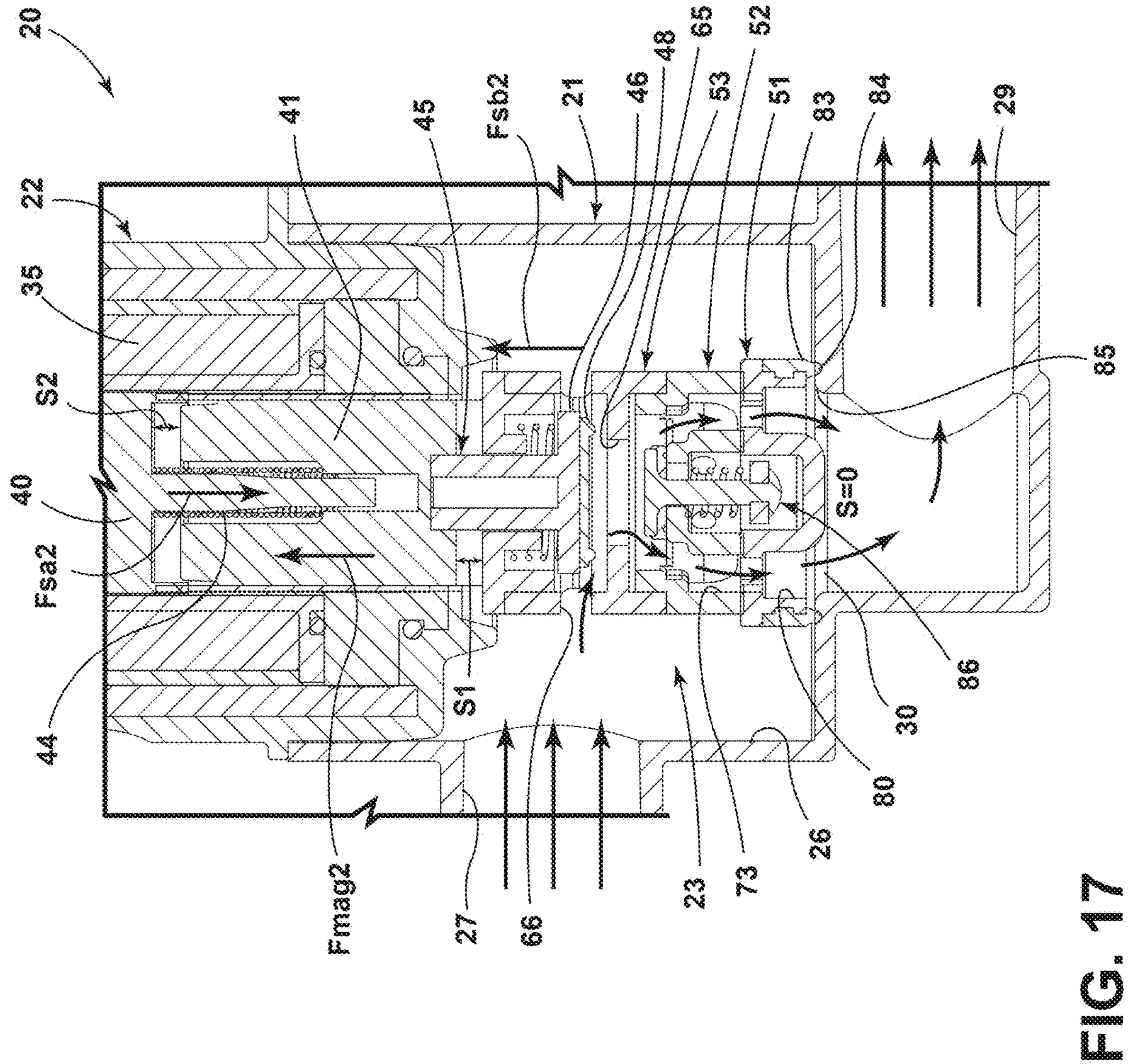
FIG. 17 is a sectional view of a portion of the fuel tank isolation valve of FIG. 2 illustrating a first stage open disposition of the valve.

With reference next to FIG. 17, a certain predetermined control voltage is applied to the solenoid 22 via the electrical terminal 50 and resultant current is delivered to the coil 35. The application of voltage to the coil 35 generates a magnetic force that is sufficient to move the moveable plunger 41 away from the valve assembly 23 and towards the stationary core 40, which compresses the primary spring 44 a distance S1. The distance between the moveable plunger 41 and the stationary core 40 is thereby a distance S2. Movement of the moveable plunger 41 unseats the head 46 of the first stage poppet 45 from the first stage valve seat 64, and the distance the head 46 of the first stage poppet 45 moves away from the first stage valve seat 64 is the distance S1. The distance St (see above) is equal to the sum of the distance S1 and the distance S2. The second stage valve surface 84 of the head 51 remains seated on the second stage valve seat 85. Due to the first stage of the valve 20 being relatively smaller than the second stage of the valve 20, the amount of magnetic force required to open the first stage of the valve is relatively small. Opening of the first stage of the valve assembly 23 to an open disposition allows for flow of fuel vapor through a “secondary,” internal (to the valve assembly 23) flow path through the valve assembly 23 from the tank port 27 and into the canister port 29 so that the fuel vapors may pass to the evaporative emissions canister. This state can be used, for example, during refueling of the fuel tank. As shown by arrows in FIG. 17 and with additional reference to FIGS. 9, 11, and 14, the flow path of fuel vapors in this first stage disposition runs from the tank port 27 into the valve chamber 26, from the valve chamber 26 through the tank pressure passages 66 in the sleeve 53 to the inside of the sleeve, through the first stage valve opening 65 and into the sleeve 53, through the first stage flow passages 73 in the central body 52 and the first stage flow passages 80 in the head 51, through the transfer passage 30 and into the canister port 29, and then out of the canister port 29 to exit the fuel tank isolation valve 20. Thus, the tank pressure passages 66 provide fluid (vapor) communication between the valve chamber 26 and the first stage valve opening 65, and the first stage flow passages 73, 80 provide fluid (vapor) communication between the first stage valve opening 65 and the canister port 29, with the first stage flow passages 80 in the head 51 being continuous with the transfer passage 30.

Figure 18:
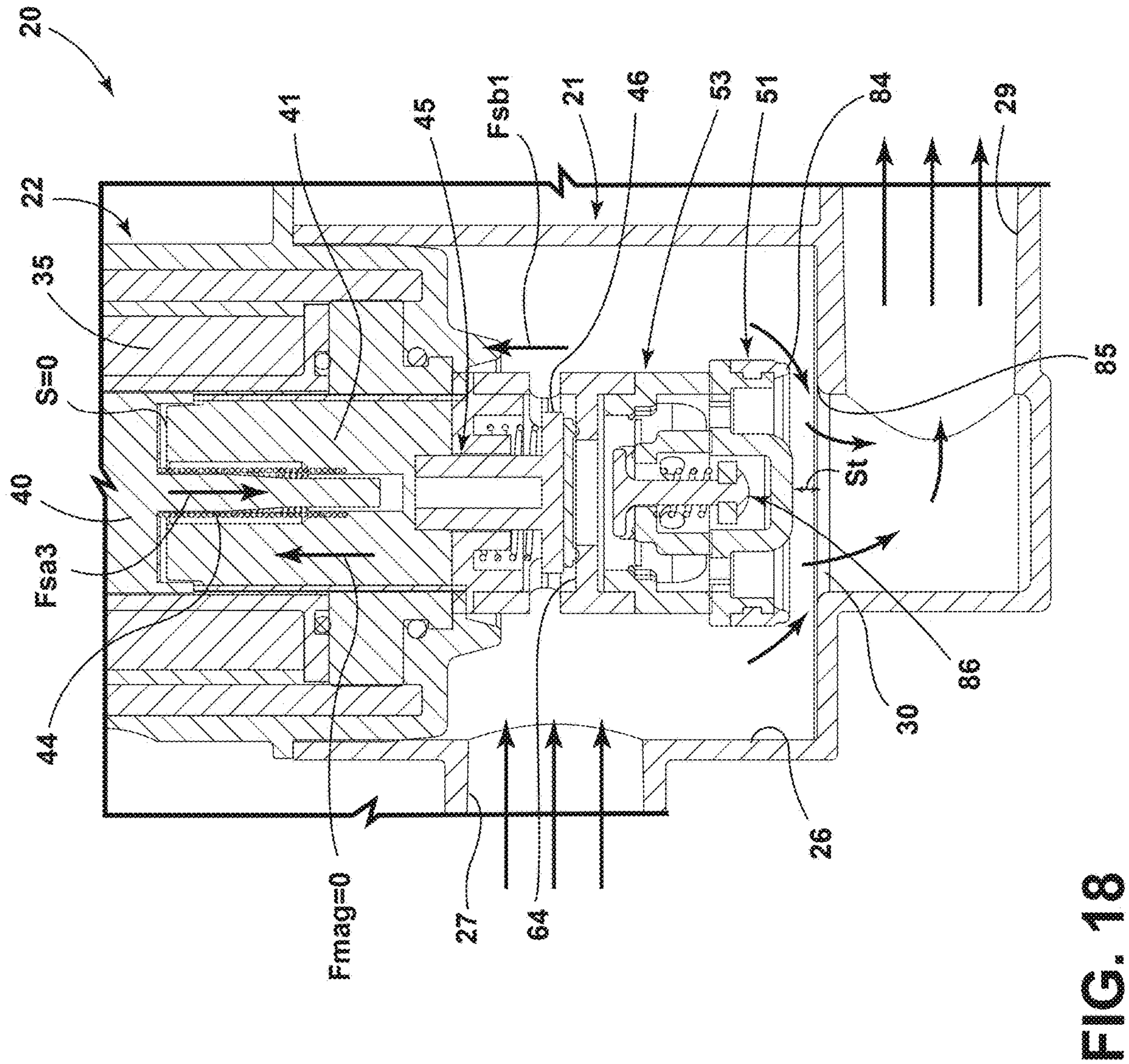
FIG. 18 is a sectional view of a portion of the fuel tank isolation valve of FIG. 2 illustrating a second stage open disposition of the valve.

Turning next to FIG. 18, a controlled voltage is maintained to the solenoid 22 and current is delivered to the coil 35 in order to generate a magnetic force that is sufficient to move the moveable plunger 41 the remaining distance S2 towards the stationary core 40, which compresses the primary spring 44 the distance St (during the second stage the spring is compressed a distance S1+S2=St) and changes the disposition of the valve assembly 23 from the first stage open disposition to a second stage open disposition. The magnetic force Fmag2 required to open the second stage of the valve assembly 23 is not much greater or less than the magnetic force Fmag1 required to open the first stage of the valve assembly 23, or stated differently Fmag1 is equal to or slightly greater than Fmag2. This mechanical advantage is enabled because after the first stage opening of the fuel tank isolation valve 20, the pressure differential between the tank port 27 and the canister port 29 decreases so that the force requirement to open the second stage of the valve 20 is significantly lower. Particularly, after the first stage opening of the valve 20, the pressure differential between the tank port 27 and the canister port 29 decreases so that the force requirement to open the second stage of the valve 20 is significantly lower than what would be required under the initial tank pressure condition, or if the valve were to open all in one stage (distance St). Thus, the power required to open the present two-stage valve is significantly less than in a single stage valve in which the pneumatic forces on the single valve seat area are high requiring more energy (power), current, and wire coil turns to reach the required magnetic force levels necessary for valve opening. Hence, the present two-stage valve requires less energy and fewer coil turns. In the second stage open disposition, the head 46 of the first stage poppet 45 is reseated on the first stage valve seat 64, while the second stage valve surface 84 unseats and moves away from the second stage valve seat 85. Opening of the second stage of the valve assembly 23 to an open disposition allows for the flow of fuel vapor through a “primary,” external (to the valve assembly 23) flow path past the valve assembly 23 and into the canister port 29 so that fuel vapors may pass to the evaporative emissions canister. This state can also be used, for example, during refueling of the fuel tank. As shown by arrows, the flow path of fuel vapors in this second stage runs from the tank port 27 into the valve chamber 26, past the second stage valve surface 84 of the valve assembly 23, through the transfer passage 30 into the canister port 29, and then out of the canister port 29 to exit the fuel tank isolation valve 20.

Figure 19:
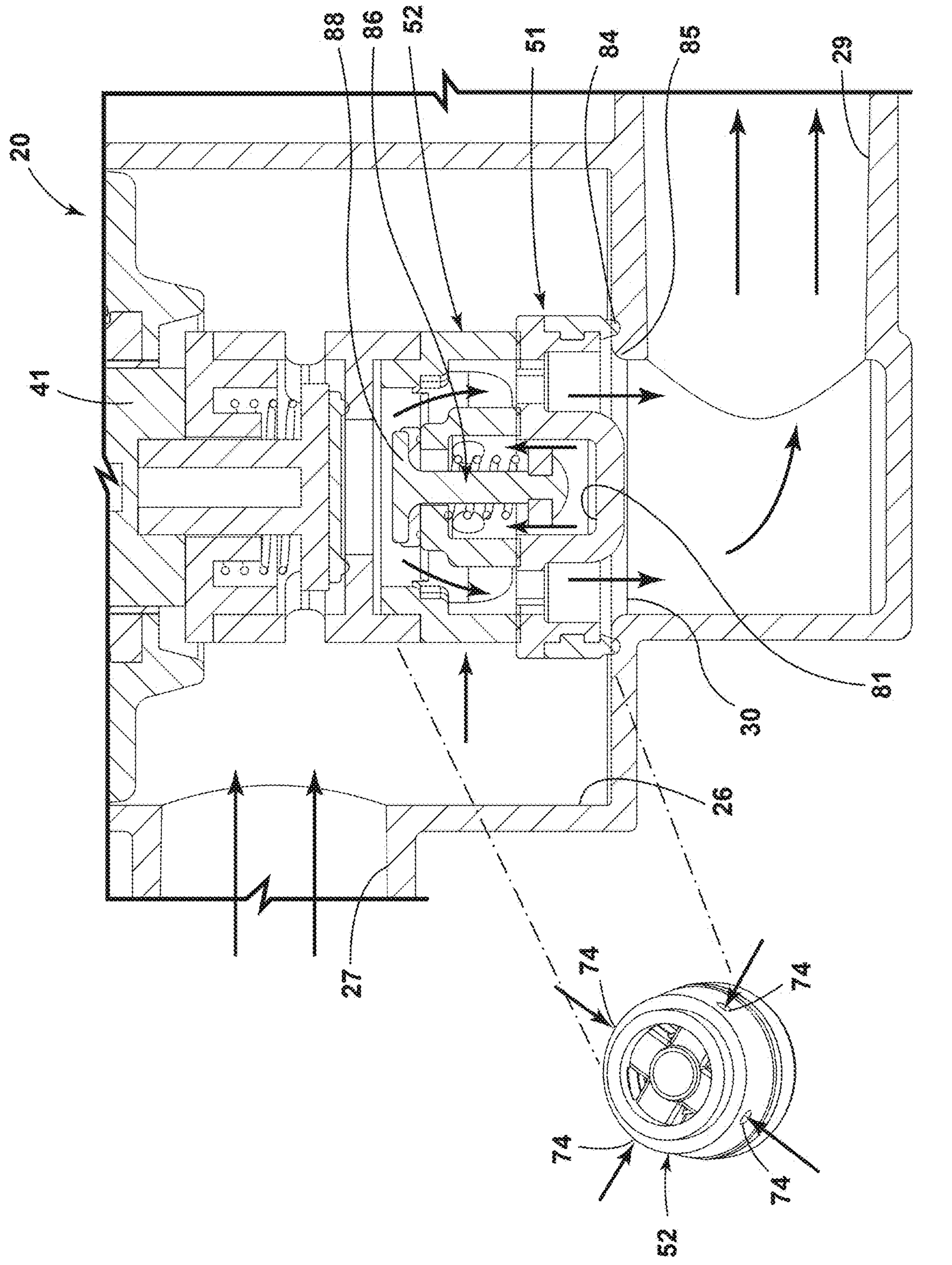
FIG. 19 is a sectional view of a portion of the fuel tank isolation valve of FIG. 2 illustrating a pressure relief valve open disposition of a pressure relief valve of the fuel tank isolation valve.

With reference now to FIG. 19, in an over-pressure condition in which the pressure in the sealed fuel tank raises to a level that exceeds a predetermined upper threshold, the fuel vapor pressure in the valve chamber 26 via flow of fuel vapor from the tank port 27 becomes greater than the opening force required to open the pressure relief poppet 86. More specifically, fuel vapors (and hence the vapor pressure) are transmitted to the pressure relief valve chamber 81 from the valve chamber 26 through the tank relief passages 74 in the central body 52. The vapor pressure in the pressure relief valve chamber 81 overcomes the spring force of the relief valve spring 93, and the head 88 of the relief valve poppet 86 unseats from the relief valve seat 90 into an open disposition. As shown by arrows in FIG. 19 and with additional reference to FIGS. 9-15, the fuel vapor may then flow along a flow path from the tank port 27 and valve chamber 26 through the tank relief passages 74 into the pressure relief valve chamber 81, then through the relief valve opening 89 and into the first stage flow passages 73 in the central body 52, then through the first stage flow passages 80 in the head 51, and subsequently through the transfer passage 30 into the canister port 29, and out of the canister port 29 to exit the fuel tank isolation valve 20 towards the evaporative emissions canister. Thus, the first stage flow passages 73, 80 are in fluid communication with the inner pressure relief valve chamber 81, and the first stage flow passages 73, 80 are outside of and surround the inner pressure relief valve chamber 81. When the vapor pressure in the fuel tank has been relieved and lowered below the acceptable, predetermined maximum, the relief valve spring 93 returns the head 88 of relief valve poppet 86 to the relief valve seat 90, whereby the pressure relief poppet 86 is moved from the open disposition back to a closed disposition.

Figure 20:
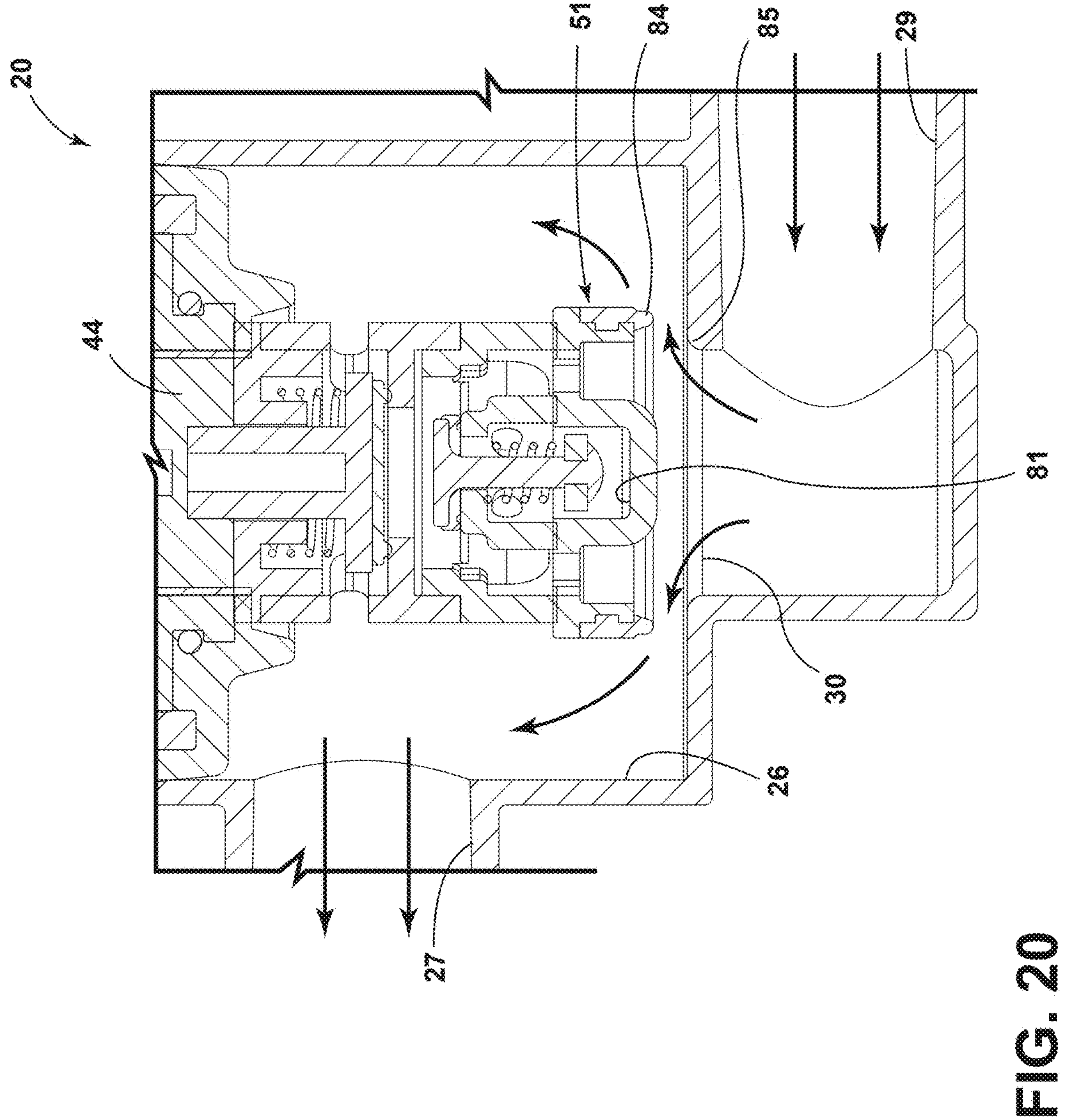
FIG. 20 is a sectional view of a portion of the fuel tank isolation valve of FIG. 2 illustrating a vacuum-pressure relief, open disposition of the fuel tank isolation valve.

Turning finally to FIG. 20, in an over-vacuum/under-pressure condition in which the pressure in the sealed fuel tank drops to a level that is below a predetermined lower threshold, the over-vacuum/under pressure acting on the valve seat 85 is sufficient to overcome the spring force of primary spring 44 acting on the moveable plunger 41, thus causing the moveable plunger to move towards the stationary core (see other views). Due to the low pressure in the valve chamber 26, movement of the moveable plunger 41 causes the second stage valve surface 84 of the head 51 to unseat from the second stage valve seat 85, thereby opening the transfer passage 30. This allows fuel vapor stored in the evaporative emissions canister to travel through the canister port 29, through the transfer passage 30 and past the second stage valve surface 84 of the head 51, into the valve chamber 26 and through the tank port 27 to exit the fuel tank isolation valve 20 and travel to the fuel tank. When the vapor pressure in the fuel tank has reached an acceptable, predetermined minimum, the primary spring 44 pushes the moveable plunger 41 away from the stationary core 40 and the fuel tank isolation valve 20 returns to the resting, closed disposition to thereby again seal the fuel tank.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

What is claimed is:

1. A fuel tank isolation valve for an evaporative emissions control system, the fuel tank isolation valve comprising:

a housing having an outer wall defining a valve chamber therein, and a transfer passage formed in a portion of the outer wall;

a tank port connected to the housing;

a canister port connected to the housing:

the tank port being in selective fluid communication with the canister port via the valve chamber and transfer passage;

a solenoid assembly connected to the housing, the solenoid assembly including a stationary core, a moveable plunger having a first end and a second end longitudinally opposed to the first end, the first end being adjacent the stationary core, a coil that encircles the stationary core and the moveable plunger, the coil actuating the moveable plunger, and a primary spring disposed between the stationary core and the moveable plunger;

a first stage poppet fixed to and extending from the second end of the moveable plunger;

a valve assembly disposed within the valve chamber, the valve assembly including a head, a central body, and a sleeve, the central body being sandwiched between the head and the sleeve, the sleeve including a first stage valve seat wherein the first stage poppet is seated on the first stage valve seat in a closed disposition;

the valve assembly further including a retainer mated with the sleeve, the retainer including an internal spring seat; and a first stage spring seated on the internal spring seat;

the first stage poppet extending through the retainer, and the first stage spring being disposed between the first stage poppet and the internal spring seat of the retainer.

2. The fuel tank isolation valve of claim 1, wherein the valve assembly further includes a pressure relief poppet, the central body includes a relief valve seat, and the pressure relief poppet is seated on the relief valve seat in a closed disposition.

3. The fuel tank isolation valve of claim 2, wherein the central body includes a relief spring seat opposite the relief valve seat, and a relief valve spring is seated on the relief spring seat and disposed between the relief spring seat and an end of the pressure relief poppet.

4. The fuel tank isolation valve of claim 3, wherein a retainer ring is disposed on the end of the relief valve poppet, and the relief valve spring is engaged with the retainer ring.

5. The fuel tank isolation valve of claim 1, further including a second stage valve seat surrounding the transfer passage.

6. The fuel tank isolation valve of claim 5, wherein a sealing ring is disposed on an annular rim of the head of the valve assembly, the sealing ring defining a second stage valve surface, and the sealing ring is seated on the second stage valve seat in a closed disposition.

7. The fuel tank isolation valve of claim 6, wherein the valve assembly is operable between the closed disposition, a first stage open disposition, and a second stage open disposition, wherein in the first stage open disposition activation of the coil draws the moveable plunger toward the stationary core and unseats the first stage poppet from the first stage valve seat while the second stage valve surface remains seated on the second stage valve seat, and in the second stage open disposition maintained activation of the coil draws the moveable plunger closer to the stationary core and unseats the second stage valve surface from the second stage valve seat while the first stage valve surface is seated on the first stage valve seat.

8. The fuel tank isolation valve of claim 1, wherein the sleeve includes at least one tank pressure passage formed through a sidewall of the sleeve.

9. The fuel tank isolation valve of claim 8, wherein the sleeve includes a first stage valve opening surrounded by the first stage valve seat, the first stage valve opening being in fluid communication with the valve chamber via the at least one tank pressure passage of the sleeve.

10. The fuel tank isolation valve of claim 9, wherein the central body includes a plurality of first stage flow passages, the head includes a corresponding plurality of first stage flow passages, and the first stage valve opening is in fluid communication with the transfer passage via the first stage flow passages in the central body and the head.

11. The fuel tank isolation valve of claim 1, wherein the central body and the head together define a pressure relief valve chamber, the central body further includes a plurality of first stage flow passages outside of the pressure relief valve chamber, the head further includes a corresponding plurality of first stage flow passages outside of the pressure relief valve chamber, the first stage flow passages of the central body being continuous with and in fluid communication with the first stage flow passages of the head.

12. The fuel tank isolation valve of claim 11, wherein the pressure relief valve chamber is in fluid communication with the first stage flow passages of the central body and the first stage flow passages of the head via a relief valve opening.

13. The fuel tank isolation valve of claim 11, wherein the central body includes at least one tank relief passage extending from a sidewall of the central body to the pressure relief valve chamber.

14. The fuel tank isolation valve of claim 10, wherein in a first stage open disposition of the valve, the valve comprises a fuel vapor flow path from the tank port into the valve chamber, from the valve chamber through the at least one tank pressure passage into the sleeve, through the first stage valve opening in the sleeve to the central body, through the first stage flow passages in the central body to the head, through the first stage flow passages in the head to the transfer passage, and through the transfer passage into the canister port.

15. The fuel tank isolation valve of claim 5, wherein in a second stage open disposition of the valve, the valve comprises a fuel vapor flow path from the tank port into the valve chamber, past the second stage valve surface of the valve member, and through the transfer passage into the canister port.

16. A method of operating a fuel tank isolation valve, the method comprising the steps of:

providing the fuel tank isolation valve of claim 6;

applying a control voltage to the coil of the solenoid assembly, wherein the valve assembly moves from a closed disposition to a first stage open disposition such that the moveable plunger is drawn toward the stationary core and unseats the first stage poppet from the first stage valve seat while the second stage valve surface remains seated; and maintaining application of the control voltage to the coil of the solenoid assembly, wherein the valve assembly moves from the first stage open disposition to a second stage open disposition such that the moveable plunger is drawn closer to the stationary core and unseats the second stage valve surface from the second stage valve seat while the first stage poppet becomes seated on the first stage valve seat.

17. An evaporative emission control system for a vehicle, the system comprising:

a fuel tank;

an evaporative emissions canister; and the fuel tank isolation valve of claim 1, wherein the fuel tank isolation valve is connected between the fuel tank and the evaporative emissions canister.

* * * * *